Patented Dec. 20, 1932

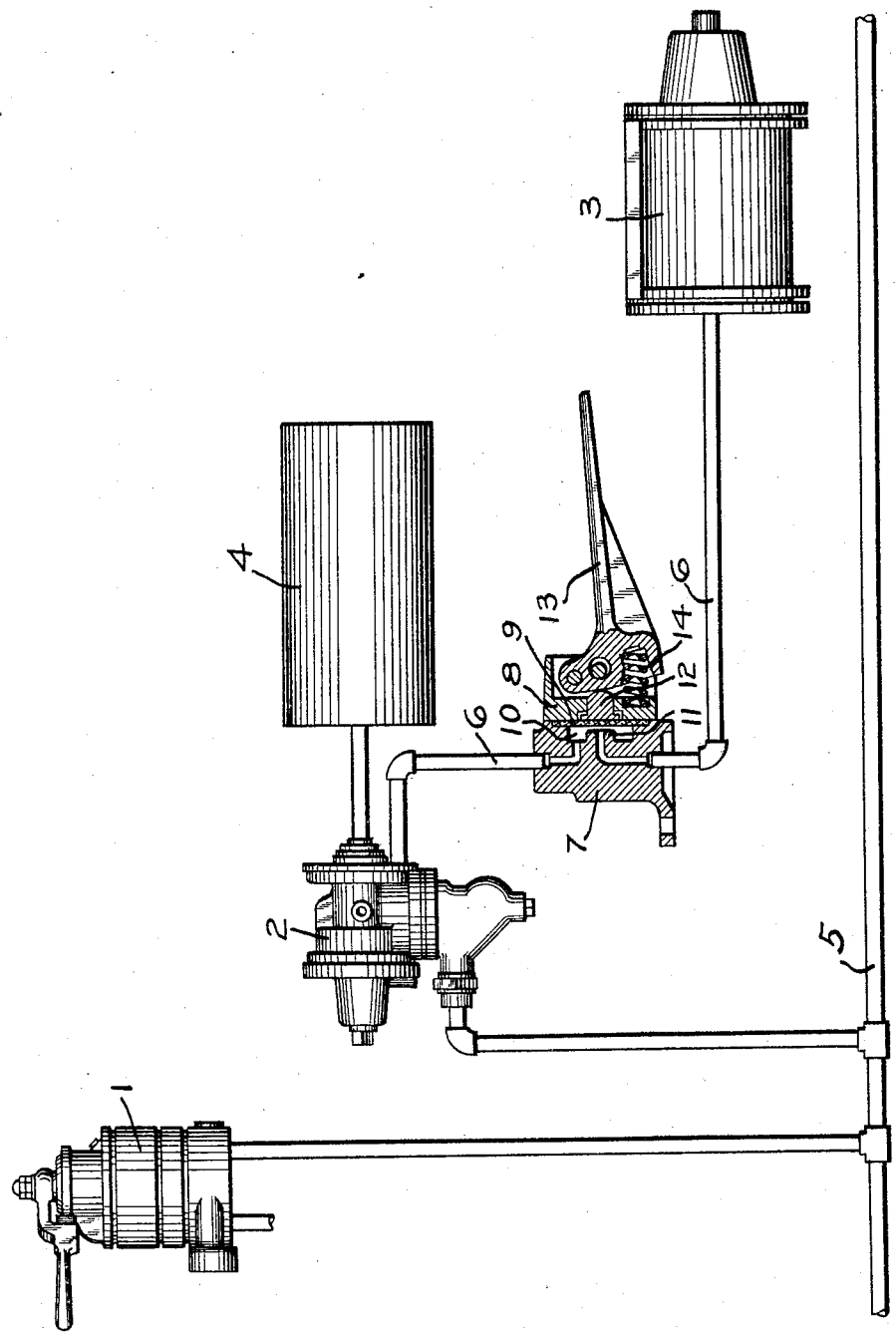

1,891,672

UNITED STATES PATENT OFFICE

FRED B. FARMER, OF EUGENE, OREGON, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed February 13, 1931. Serial No. 515,456.

This invention relates to fluid pressure brakes, and more particularly to an automatic fluid pressure brake system for controlling the brakes on railway trains.

In an automatic fluid pressure brake system, the brakes are applied by operating the engineer's brake valve on the locomotive to effect a reduction in brake pipe pressure. Since the brake pipe reduction is effective initially at the head end of the train and travels serially to the rear end, the brakes are applied first on the locomotive and the head cars, and this permits the train slack to run in. On long trains, this running in of the slack may result in excessive shocks.

The principal object of my invention is to provide means for delaying the application of the brakes on the locomotive, so that the inertia of the locomotive will tend to keep the slack from running in at the head end of the train sufficiently to prevent excessive shocks.

In the accompanying drawing, the single figure is a diagrammatic view of a locomotive brake equipment embodying my invention.

The well known E T locomotive brake equipment is almost universally employed on locomotives, but for the sake of simplicity and as sufficient to clearly illustrate my invention, I have shown in the drawing, a simple equipment comprising an engineer's brake valve device 1, a triple valve device 2, a brake cylinder 3, an auxiliary reservoir 4, and a brake pipe 5.

Interposed in the pipe 6, through which the triple valve device operates to supply fluid under pressure to the brake cylinder 3, is a manually operable valve device comprising a casing 7. Clamped to the face of the casing 7 by a cover plate 8 is a flexible diaphragm 9, and a chamber 10 formed in the casing 7 at one side of the diaphragm, is connected to the triple valve side of pipe 6. The diaphragm 9 is adapted to engage a seat 11, for controlling communication from chamber 10 to the brake cylinder side of pipe 6.

A plunger 12, mounted in an opening in the cover plate 8, engages the diaphragm 9, and a pedal lever 13, pivotally mounted on the cover plate 8, is provided with a face adapted to engage the outer end of the plunger 12. A coil spring 14, interposed between the lever 13 and the cover plate 8, urges the lever away from the plunger.

Normally, the diaphragm 9 is positioned away from the seat 11, as shown in the drawing, so that when the engineer's brake valve 1 is operated to effect a reduction in brake pipe pressure, the tripple valve device 2 or other brake controlling valve device on the locomotive will be operated to supply fluid under pressure to the pipe 6, and the diaphragm 9 being unseated, fluid under pressure flows to the brake cylinder 3 to apply the brakes on the locomotive at the same time that the brake pipe reduction is being propagated through the brake pipe to apply the brakes serially on the cars of the train.

If it is desired to hold back the application of the brakes on the locomotive, as on a long train, so as to prevent the slack from running in too severely, the engineer depresses the pedal lever 13 at the same time he operates the brake valve device 1 to effect a reduction in brake pipe pressure. The depression of the lever 13 operates to move the plunger 12, so that the diaphragm 9 is pressed against the seat 11, thus cutting off communication through which fluid under pressure is supplied to the brake cylinder. After the slack is in and the brakes have been applied on cars at the rear end of the train and danger of causing excessive shocks due to the running in of slack is past, the pedal lever 13 may be released, fully or in steps, so that fluid under pressure is then permitted to flow to the brake cylinder 3, and thereby apply the brakes on the locomotive to the extent desired.

If an emergency condition should arise during a service application of the brakes, under which the locomotive brakes have been prevented from applying, the release of the pedal will produce immediate and full brake application without loss of time or pressure.

It will be understood that the word "manually" is intended to include both foot and hand control.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake controlling valve device normally operable to effect an application of the brakes on the locomotive, of means operable manually by the engineer from the locomotive cab for rendering said valve device ineffective to apply the brakes on the locomotive.

2. In a locomotive fluid pressure brake equipment, the combination with a brake pipe, a brake cylinder, and a brake controlling valve device operated upon a reduction in brake pipe pressure for supplying fluid under pressure to the brake cylinder, of means operable manually by the engineer from the locomotive cab for rendering said valve device ineffective to supply fluid under pressure to the brake cylinder.

3. In a locomotive fluid pressure brake equipment, the combination with a brake pipe, a brake cylinder, and a brake controlling valve device operated upon a reduction in brake pipe pressure for supplying fluid under pressure to the brake cylinder, of valve means for controlling communication through which said valve device supplies fluid under pressure to the brake cylinder and normally urged to open position, and a manually operated means for operating said valve means to cut off said communication.

4. In a locomotive brake equipment, the combination with a brake pipe, a brake cylinder, a brake controlling valve device operated upon a reduction in brake pipe pressure for supplying fluid under pressure to the brake cylinder, and a brake valve device for effecting a reduction in brake pipe pressure, of manually operable means under the control of the engineer while in the locomotive cab for preventing the supply of fluid under pressure to the brake cylinder by operation of said brake controlling valve device.

5. In a locomotive brake equipment, the combination with a brake pipe, a brake cylinder, a brake controlling valve device operated upon a reduction in brake pipe pressure for supplying fluid under pressure to the brake cylinder, and a brake valve device for effecting a reduction in brake pipe pressure, of valve means for controlling communication through which said brake controlling valve device supplies fluid under pressure to the brake cylinder and biased to open position, and a pedal lever for operating said valve means to close said communication.

6. In a locomotive fluid pressure brake equipment, the combination with a brake pipe and brake cylinder, of a brake controlling valve device operative upon a reduction in brake pipe pressure for supplying fluid to the brake cylinder, said valve device being the sole means for supplying fluid to the brake cylinder, and means operable by the engineer for at will opening and closing communication through which said valve device supplies fluid to the brake cylinder.

In testimony whereof I have hereunto set my hand, this 29th day of January, 1931.

FRED B. FARMER.